Aug. 19, 1947. N. C. CHRISTENSEN 2,425,995
PROCESS FOR TREATING OXIDIZED ORES OF ZINC
Filed Jan. 17, 1944
FLOW SHEET
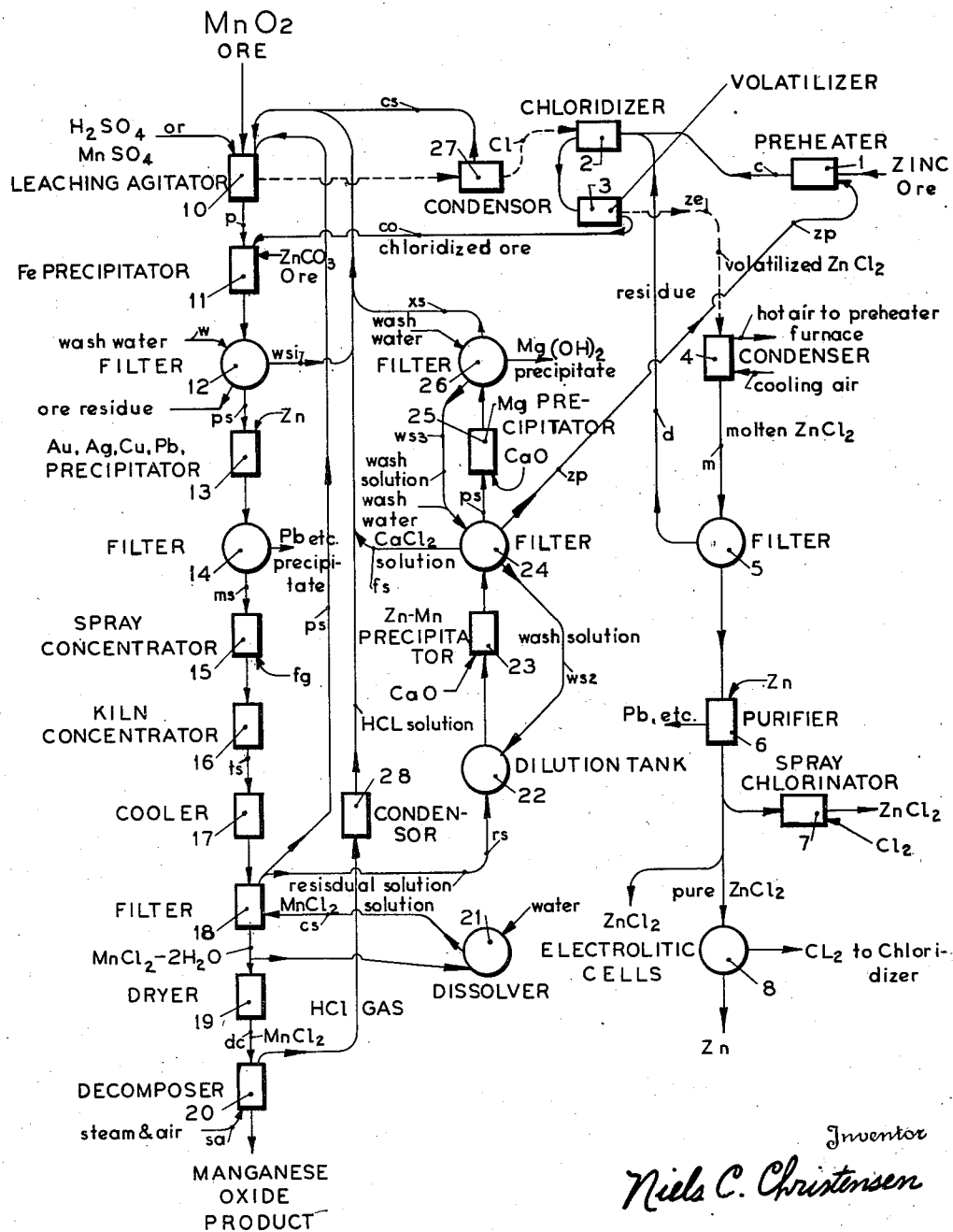
Inventor
Niels C. Christensen Patented Aug. 19, 1947

UNITED STATES PATENT OFFICE 2,425,995

PROCESS FOR TREATING OXIDIZED ORES OF ZINC

Niels C. Christensen, Salt Lake City, Utah, assignor to Combined Metals Reduction Company, Salt Lake City, Utah, a corporation of Utah Application January 17, 1944, Serial No. 518,620

12 Claims. (Cl. 23—97)

This invention relates to a process for the treatment of oxidized zinc ores and also to the treatment of such ores in combination with $MnO_2$ ores. The process is especially adapted to the treatment of oxidized zinc ores which contain large amounts of iron oxide or soluble silicates and which are therefore not well adapted to treatment by acid leaching process due to the large amount of iron dissolved or to the formation of gelatinous silica in the leaching treatment. The process is especially directed to the recovery of zinc from the zinc ore as a pure zinc chloride or as metal, and also to the recovery of the manganese from the manganese as a high grade manganese oxide product.

The process consists in general of the following steps:

I. Selective chloridizing of the zinc ore at a high enough temperature to distill off the zinc as $ZnCl_2$.

II. Condensing and purification of the $ZnCl_2$.

III. Electrolysis of the molten $ZnCl_2$ in a bath of mixed chlorides to recover the zinc as molten zinc metal and the $Cl_2$ for reuse in the process.

IV. Generation of the chlorine for the zinc ore chloridizing operation if the zinc is disposed of as $ZnCl_2$ or to make up for loss of chlorine in the process if the zinc is recovered as metallic zinc.

The complete process is illustrated in the accompanying flow sheet and the method of using the process is explained in detail in the following description.

I. Selective chloridizing of zinc ore

The selective chloridizing of the zinc in the ore is carried out by mixing the ore with the proper proportion of finely divided carbon preferably coke or charcoal and treating the heated mixture with chlorine. (Low temperature coke or char from the low temperature carbonization of bituminous coal has been found especially well suited for this operation.) By the use of an equivalent of carbon to zinc in the ore the zinc may be selectively chloridized without chloridizing the iron in the ore, as indicated in the following chemical equation:

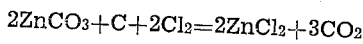

$$2ZnCO_3 + C + 2Cl_2 = 2ZnCl_2 + 3CO_2$$

Manganese, lead, and silver in the ore may also be selectively chloridized in the presence of iron oxide by using just sufficient carbon to secure the chloridizing of these metals as indicated in the following equation:

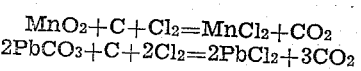

$$MnO_2 + C + Cl_2 = MnCl_2 + CO_2$$
$$2PbCO_3 + C + 2Cl_2 = 2PbCl_2 + 3CO_2$$

If the zinc ore contains manganese and lead, sufficient carbon must be used to secure the chloridizing of these metals since they are selectively chloridized in preference to both the zinc and iron if insufficient carbon is used. By the use of only sufficient carbon to secure chloridizing of the manganese, lead and zinc these metals may be selectively chloridized without chloridizing any of the iron in the ore.

By conducting the chloridizing operation above 732°, the boiling point of $ZnCl_2$, the zinc may be chloridized and completely volatilized as $ZnCl_2$.

The chloridization of the zinc and volatilization of the $ZnCl_2$ is preferably carried out in three steps. In the first step the ore mixed with coke dust or coal dust is heated to approximately 550° C. in a suitable preheating furnace 1 such as a rotary type furnace or multiple hearth muffle furnace. In this heating operation the moisture in the ore is completely removed and the zinc carbonate is decomposed to ZnO as indicated in the following equation:

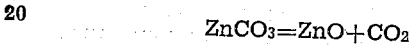

$$ZnCO_3 = ZnO + CO_2$$

If coal dust is used in the process the volatile material in the coal is distilled out of the coal leaving behind only the carbon mixed with the ore. This operation is preferably carried out in a muffle type furnace. The hot mixture of ore and carbon is next treated with chlorine in a muffle type furnace 2 (indicated as chloridizer on the flow sheet) at a temperature of approximately 550° C.–600° C., the mixture of ore and carbon being passed through the furnace in countercurrent to the stream of chlorine gas. In this step the zinc (and Mn and Pb and Ag) is chloridized as described above. The chloridized ore is then heated to 750° C. or higher to boil off or volatilize the $ZnCl_2$ in the volatilizing furnace 3 called volatilizer on the flow sheet. This step is also carried out in a muffle type furnace. The three steps may be carried out in separate furnaces but are preferably carried out in a three section multiple hearth furnace, the mixture of ore and carbon being dried and preheated on the upper hearths (with furnace gases from the lower muffle hearths), the ore then being chloridized in the intermediate muffle hearths, and the zinc chloride being distilled off in the lower muffle hearths. The chloridized ore residue (co) from the volatilizer 3 is sent to the Fe precipitator 11 for recovery of the unvolatilized chloridized metals as later described.

II. Condensing and purification of the $ZnCl_2$

The volatilized $ZnCl_2$ (ze) and $CO_2$ gas from the volatilizer 3 are sent to the condenser 4 in which the temperature of the gases and $ZnCl_2$ vapor is reduced sufficiently to condense the $ZnCl_2$ to a liquid. The $CO_2$ gas (containing any residual chlorine) is used for preheating the ore in countercurrent in the preheater 1, in which the residual chlorine is collected by reacting with the zinc, manganese, and lead in the ore as indicated in the equations previously given.

The condensed molten ZnCl₂ (m) from the condenser contains dust and chlorides carried over from the volatilizer 2. These solid impurities (d) are filtered out of the molten zinc chloride in the filter 5 and sent to the chloridizer 2. The clean zinc chloride is treated with zinc metal in the purifier 6 to decompose any lead chloride or copper chloride or other chlorides as indicated in the following chemical equation:

$$PbCl_2 + Zn = ZnCl_2 + Pb$$

This operation is preferably carried out at a temperature above the melting point of lead so that any lead may be separated in a molten condition, the impure zinc chloride being passed over zinc bars or balls in a suitable insulated iron trough. The purified molten ZnCl₂ dissolves some metallic zinc. If the ZnCl₂ is to be marketed as such the molten chloride may be treated with chlorine in the chlorinator 7 by bubbling the chlorine through the molten ZnCl₂ or by passing the chlorine through the sprayed liquid if a spray apparatus is used. If the ZnCl₂ is to be electrolyzed for the recovery of the zinc and chlorine this chlorination step is not necessary and the molten zinc chloride from the purifier 6 is electrolyzed in the electrolyte cell 8 producing metallic zinc and chlorine as indicated in the following equation:

$$ZnCl_2 = Zn + Cl_2$$

The chlorine thus produced is sent to the chloridizer 2 for the treatment of more zinc ore. The electrolysis of the ZnCl₂ may be carried out in a bath of mixed chlorides at a temperature above the melting point of the zinc so as to obtain the zinc in molten condition, but is preferably carried out in a molten mixture of alkali earth metal chlorides and alkali metal chlorides such as CaCl₂, MgCl₂, NaCl, KCl and LiCl a temperature of approximately 350° C. using a solid zinc cathode which is continuously withdrawn from cell as the zinc is deposited thereon, the ZnCl₂ being continuously added to the cell as used and the other chlorides being used in just sufficient amount to form a low melting point mixture. When carried out in this electrolyte at this low temperature, a relatively high current efficiency is secured as only a relatively small amount of metallic zinc is dissolved in the ZnCl₂ at this temperature whereas, when operating at 450° C. to 500° C. or higher, a considerable amount of zinc is dissolved in the molten electrolyte and converted back to ZnCl₂ at the anode.

IV. *Generation of the chlorine, etc.*

If the zinc from the zinc ore is marketed as ZnCl₂ the chlorine required to chloridize the zinc ore is secured from the treatment of MnO₂ ore by leaching with an HCl solution to generate the chlorine and treating the MnCl₂ thus formed to recover the chlorine therefrom as HCl and secure a high grade manganese oxide product. If the zinc from the zinc ore is not marketed as ZnCl₂ but as metallic zinc, the chlorine needed to make up for losses and for the chlorine required in chloridizing the Pb and the Ca and Mg in the zinc ore is also secured from the leaching of MnO₂ ore with HCl.

The treatment of the MnO₂ ore for the generation of the chlorine needed in the process, the recovery of the manganese from the manganese chloride solution, the regeneration of the HCl used in treating the manganese ore, and the recovery of the valuable metals from both the MnO₂ and the oxidized zinc ore are carried out as set forth in the following description.

The MnO₂ ore is leached with HCl in a hot relatively concentrate chloride solution in the leaching agitator 10 to generate the chlorine and form MnCl₂ in the solution as indicated in the following chemical equation:

$$MnO_2 + 4HCl = MnCl_2 + Cl_2 + 2H_2O$$

The chlorine gas (Cl) from the leacher 10 is passed through the condenser 27 to remove the moisture before being sent to the chloridizer 2 the condensed solution (cs) being returned to the leaching agitator 10. The leaching operation may be carried out in a concurrent agitator with HCl solution from the condenser 28, or in a spray leacher of the type described in my U. S. Patents Nos. 1,462,363 and 1,803,792, the mixture of ore and solution being passed through the spray tunnel in countercurrent to the hot HCl gases from the decomposer 20 and the chlorine being discharged from the end of the spray tunnel opposite to that at which the HCl gases enter. If the spray type apparatus is used in the leaching operation the condenser 28 may be omitted. The HCl for this leaching operation is supplied by decomposition of MnCl₂ made in the process and from the decomposition of the CaCl₂ formed in the process, by treatment with H₂SO₄ (or MnSO₄ if this is available), as hereafter described.

The pulp (p) from the leaching agitator 10 is mixed with the chloridized ore (co) residue from the volatilizer 3 and to this mixture ZnCO₃ ore is added in sufficient quantity to precipitate the iron from solution as indicated in the following equation:

$$2FeCl_3 + 3ZnCO_3 + 3H_2O = 2Fe(OH)_3 + 3ZnCl_2 + 3CO_2$$

The mixture of ores is agitated in a suitable agitator 11 (indicated as Fe precipitator in the flow sheet) until the chlorides in the chloridized ore residue (co) are dissolved in the solution and the iron is precipitated. The mixture of ore residue and iron hydroxide is separated from the pregnant MnCl₂ solution (ms) on the filter 12 and the filter cake is washed with water, the wash solution (ws) being sent to the leaching agitator 10 for use in leaching the MnO₂ ore. From the pregnant solution (ps) the Au, Ag, Cu, and Pb in solution are precipitated with zinc metal (preferably zinc dust) in the precipitator 13 and the precipitated metals are separated from the solution (ms) on the filter 14.

The solution from the filter 14 contains only MnCl₂, ZnCl₂, CaCl₂ and MgCl₂. This solution is concentrated to recover the MnCl₂ as crystals of MnCl₂·2H₂O by a process of selective crystallization in which the greater part of the MnCl₂ is precipitated leaving the other chlorides in solution. The solution (ms) is heated and evaporated and concentrated in the spray concentrator 15 until a thin slurry of crystals and solution is formed the solution being passed through the spray tunnel in countercurrent to hot furnace gases (fg). The concentration is then continued in the kiln evaporator 16 until a thick slurry of crystals of MnCl₂·2H₂O and residual solution is formed. This mixture of crystals and residual solution (ts) is cooled to approximately 70° C. in the cooler 17 and the crystals of MnCl₂·2H₂O are separated from the residual solution (rs) and washed with a hot concentrated MnCl₂ solution at approximately 70° C. on the filter 18. The MnCl₂ was solution (cs) is made by dissolving washed MnCl₂.2H₂O crystals in hot water in the dissolving tank 21. The filter cake of MnCl₂.2H₂O is dried to a substantially anhydrous MnCl₂ (dc) product in the drier 19. The dry MnCl₂ product (dc) is crushed to approximately six or eight mesh and heated with steam and air (oxygen) in the decomposing furnace 20 (indicated as decomposer on the flow sheet) to decompose the MnCl₂ and form a manganese oxide product (mo) and HCl as indicated in the following equation:

$$3MnCl_2 + 3H_2O + O = Mn_3O_4 + 6HCl$$

Th HCl gases are sent to the spray leacher 10 or are condensed to form a concentrated HCl solution in the condenser 28 and the HCl solution is sent to the leaching agitator 10 for use in leaching more MnO₂ ore.

The residual solution (rs) from the filter 18 contains the unprecipitated MnCl₂ and the ZnCl₂, CaCl₂ and MgCl₂ from the ores treated in the process. Part of this solution is (ps) and is returned to the leaching agitator 10 so as to maintain a relatively concentrated chloride solution in the leaching circuit. The remainder of the residual solution (rs) is diluted with washer solutions (ws2) from the subsequent filtering and washing operation in the dilution tank 22 and is treated with lime to precipitate the Zn and residual Mn from the solution in the ZnMn precipitator 23 (a pebble mill using small pebbles or porcelain marbles is employed to break up the lumps and secure complete utilization of the CaO). The zinc is precipitated as a zinc hydroxychloride and the manganese as a hydroxide as indicated in the following equation:

$$4ZnCl_2 + 3Ca(OH)_2 = 2Zn_2(OH)_3Cl + 3CaCl_2$$
$$MnCl_2 + Ca(OH)_2 = Mn(OH)_2 + CaCl_2$$

If the chemical equivalent of lime to both zinc and manganese in solution is used, an amount of magnesium equivalent to one-fourth of the zinc is also precipitated as Mg(OH)₂. The mixed precipitates are separated from the CaCl₂ solution and washed with water on the filter 24, the wash solution (ws2) being sent to the dilution tank 22 for use in diluting the residual solution (rs). The mixed precipitates (zp) from the filter 24 are sent to the preheater 1 and are passed through the chloridizing operation for recovery of the zinc and manganese as previously described. In the preheater 1 the zinc hydroxychloride reacts with the manganese or magnesium hydroxide to form zinc oxide and manganese or magnesium chloride as indicated in the following equation:

$$2Zn_2(OH)_3Cl + Mg(OH)_2 = 4ZnO + MgCl_2 + 4H_2O$$
$$2Zn_2(OH)_3Cl + Mn(OH)_2 = 4ZnO + MnCl_2 + 4H_2O$$

The ZnO is chloridized and recovered along with the zinc in the oxidized ore and the MnCl₂ is recovered from the chloridized ore residue (co) in the agitator 11 (iron precipitator).

The CaCl₂ solution (fs) is sent to the leaching agitator 10 in which the Ca is precipitated as CaSO₄ and the HCl is regenerated by the addition of H₂SO₄ as indicated in the following chemical equation:

$$CaCl_2 + H_2SO_4 = CaSO_4 + 2HCl$$

The HCl thus regenerated is used to leach the MnO₂ ore for the generation of the chlorine used in the chloridizing of the zinc ore and for the dissolving of soluble minerals in the MnO₂ ore.

If MnSO₄ is available, this may be used instead of H₂SO₄, the CaSO₄ being precipitated as CaSO₄ and MnCl₂ formed in solution as indicated in the following chemical equation:

$$CaCl_2 + MnSO_4 = CaSO_4 + MnCl_2$$

From the MnCl₂ thus formed the Mn is recovered as a manganese product and the chlorine as HCl for use in leaching the MnO₂ as previously described. In both of the above cases the CaSO₄ is discharged with the ore residue from the filter 12. If the ores contain soluble or chloridizable magnesium minerals MgCl₂ will accumulate in solution. To prevent the building up of the MgCl₂ in solution beyond a desirable concentration a sufficient portion (ps) of the solution from the filter 24 is treated with lime in a pebble mill 25 (called Mg precipitator on the flow sheet) to precipitate the magnesium as Mg(OH)₂ as indicated in the following equation:

$$MgCl_2 + Ca(OH)_2 = Mg(OH)_2 + CaCl_2$$

The Mg(OH)₂ is separated from the CaCl₂ solution and washed with water on the filter 26 the CaCl₂ solution being sent to the leaching agitator 10 and the wash solution (ws3) being used to wash the Zn-Mn precipitate on the filter 24.

Though the process as described provides that the chlorine used in the process is made by leaching of MnO₂ ore with HCl, it will be apparent that the oxidized zinc ore may be chloridized with chlorine from other sources, but the process as described is preferred, since it provides a method of treating a manganese ore as well as the zinc ore.

What is claimed is:

1. The process of treating oxidized zinc ores containing iron oxide and comprising a chloridizing step, which consists in mixing the ore with carbon in proper proportion to secure selective chloridizing of the zinc and not of the iron, heating said mixture, treating said mixture with chlorine to selectively chloridize the zinc and not the iron, and distilling off the ZnCl₂ thus formed.

2. The process of treating oxidized zinc ores containing iron oxide together with other oxidized ores of other metals in the group consisting of manganese, lead and silver and comprising a chloridizing step, which consists in mixing the ore with carbon in proper proportion to secure selective chloridizing of the zinc and of said other metals and not of the iron, heating said mixture, treating said mixture with chlorine to selectively chloridize the zinc and said other metals and not the iron, distilling off the ZnCl₂ thus formed, condensing the distilled ZnCl₂ to liquid ZnCl₂, filtering said liquid ZnCl₂ to remove any contained solid impurities therefrom, treating said filtered ZnCl₂ with metallic zinc to precipitate therefrom metals below zinc in the electromotive series, and removing said precipitated metals to secure clean ZnCl₂.

3. The process of treating oxidized zinc ores containing iron oxide together with other oxidized ores of other metals in the group consisting of manganese, lead and silver and comprising a chloridizing step, which consists in mixing the ore with carbon in proper proportion to secure selective chloridizing of the zinc and of said other metals and not of the iron, heating said mixture, treating said mixture with chlorine to selectively chloridize the Zn and said other metals and not the iron, distilling off the ZnCl₂ thus formed, condensing the distilled ZnCl₂ to liquid ZnCl₂, filtering said liquid ZnCl₂ to remove any contained solid impurities therefrom, treating said filtered ZnCl₂ with metallic zinc to precipitate therefrom metals below zinc in the electromotive series, removing said precipitate metals to secure clean ZnCl₂, electrolyzing said clean ZnCl₂ in a molten condition to recover the Zn and chlorine therefrom, and using the chlorine in chloridizing more ore.

4. The process of treating oxidized zinc ores containing iron oxide together with other oxidized ores of other metals in the group consisting of manganese, lead and silver and comprising a chloridizing step, which consists in mixing the ore with carbon in proper proportion to secure selective chloridizing of the zinc and of said other metals and not of the iron, heating said mixture, treating said mixture with chlorine to selectively chloridize the Zn and said other metals and not the iron, distilling off the ZnCl₂ thus formed, condensing the distilled ZnCl₂ to liquid ZnCl₂, filtering said liquid ZnCl₂ to remove any contained solid impurities therefrom, treating said filtered ZnCl₂ with metallic zinc to precipitate therefrom metals below zinc in the electromotive series, removing said precipitate metals to secure clean ZnCl₂, electrolyzing said clean ZnCl₂ in a molten condition and in a mixed bath of alkali earth metal chlorides and alkali chlorides at a temperature below the melting point of zinc to recover therefrom zinc in solid form and chlorine, and using the chlorine in chloridizing more ore.

5. The process of treating oxidized zinc ores containing iron and manganese oxides in conjunction with MnO₂ ores, which consists in mixing the oxidized zinc ore with carbon in proper proportion to secure selective chloridizing of the zinc and manganese and not of the iron, heating said mixture, treating the heated mixture with chlorine to selectively chloridize the zinc and manganese and not the iron, distilling off the ZnCl₂ thus formed, leaving a distillation residue containing manganese chloride, condensing the ZnCl₂ to recover liquid ZnCl₂; leaching MnO₂ ore with HCl to recover the Mn as MnCl₂ in solution and generate chlorine, leaching the zinc ore distillation residue to recover the MnCl₂ therefrom in solution, recycling said chlorine to said selective chloridizing step, heating, evaporating and concentrating the MnCl₂ solutions, recovering MnCl₂ from the concentrated residual solution as crystals of MnCl₂.2H₂O, drying said crystals, treating the dried MnCl₂ product with steam and air to decompose the MnCl₂ and thereby recover a manganese oxide product and HCl, and using said HCl for the treatment of more MnO₂.

6. The process of treating oxidized zinc ores containing iron and manganese oxides in conjunction with MnO₂ ores which consists in mixing the oxidized zinc ore with carbon in proper proportion to secure selective chloridizing of the zinc and manganese and not of the iron, heating said mixture, treating the heated mixture with chlorine to selectively chloridize the zinc and manganese and not the iron, distilling off the ZnCl₂ thus formed, leaving a distillation residue containing manganese chloride, condensing the ZnCl₂ to recover liquid ZnCl₂, filtering any contained solid impurities out of said liquid ZnCl₂ and returning any such impurities for treatment with more zinc ore, leaching the zinc ore distillation residue with the concentrated residual solution mentioned below to recover the MnCl₂ therefrom; leaching MnO₂ ore with HCl to recover the Mn as MnCl₂ in solution and generate chlorine, recycling said chlorine to said selective chloridizing step, heating, evaporating and concentrating the MnCl₂ solution, recovering MnCl₂ from the concentrated residual solution in solid form as crystals of MnCl₂.2H₂O and using said last residual solution in leaching the zinc ore distillation residue and more MnO₂ ore, drying said crystals, treating the dried MnCl₂ product with steam and air to decompose the MnCl₂ and thereby recover a manganese oxide product and HCl, and using said HCl for the treatment of more MnO₂.

7. The process of treating oxidized zinc ores containing iron and manganese oxides in conjunction with MnO₂ ores containing zinc which consists in mixing the oxidized zinc ore with carbon in proper proportion to secure selective chloridizing of the zinc and manganese and not of the iron, heating said mixture, treating the heated mixture with chlorine to selectively chloridize the zinc and manganese and not the iron, distilling off the ZnCl₂ thus formed, leaving a distillation residue containing manganese chloride, condensing the ZnCl₂ to recover liquid ZnCl₂, filtering any contained solid impurities out of said liquid ZnCl₂ and returning any such impurities for treatment with more zinc ore, leaching the zinc ore distillation residue with the filtrate mentioned below to recover MnCl₂ therefrom; leaching MnO₂ ore with HCl to recover the Mn as MnCl₂ in solution and generate chlorine, recycling said chlorine to said selective chloridizing step, heating, evaporating and concentrating the MnCl₂ solution and recovering MnCl₂ from the concentrated residual solution as crystals of MnCl₂.2H₂O, recycling part of said residual solution for leaching of more MnO₂ ore, diluting the remainder of said residual solution with wash solutions from subsequent filtering operations, precipitating the manganese and zinc therefrom with lime, filtering and washing the precipitate thus formed and adding it to more of the zinc ore being chloridized, using the resultant filtrate for the leaching of more of the zinc ore distillation residue and more MnO₂ ore, drying said crystals and treating the dried MnCl₂ product with steam and air to decompose the MnCl₂ and recover a manganese oxide product and HCl, and using said HCl for the treatment of more MnO₂.

8. The process of treating oxidized zinc ores containing iron and manganese in conjunction with MnO₂ ores which consists in mixing the oxidized zinc ore with carbon in proper proportion to secure selective chloridizing of the zinc and manganese and not of the iron, heating said mixture, treating the heated mixture with chlorine to selectively chloridize the zinc and manganese and not the iron, distilling off the ZnCl₂ thus formed, leaving a distillation residue containing manganese chloride and condensing the ZnCl₂ to recover liquid ZnCl₂, filtering any contained solid impurities out of said liquid ZnCl₂ and returning any such impurities for treatment with more zinc ore, leaching the zinc ore distillation residue with the filtrate mentioned below to recover MnCl₂ therefrom; leaching MnO₂ ore with HCl to recover the Mn as MnCl₂ in solution and generate chlorine, recycling said chlorine to said selective chloridizing step, and precipitating any iron present in the MnCl₂ solution with ZnCO₃ ore, separating the solution from the ore residue and iron precipitate, heating, evaporating and concentrating the MnCl₂ solution and recovering MnCl₂ from the concentrated residual solution as crystals of MnCl₂.2H₂O, recycling part of said residual solution for the leaching of more MnO₂ ore, diluting the remainder of said residual solution with wash solutions from subsequent filtering operations, precipitating the zinc and manganese therefrom with lime, filtering and washing the precipitate thus formed, and adding the precipitate to more of the zinc ore being chloridized, using the resultant filtrate for the leaching of more of the zinc ore distillation residue and more MnO₂ ore, drying said crystals and treating the dried MnCl₂ product with steam and air to decompose the MnCl₂ and recover a manganese oxide product and HCl, and using said HCl for the treatment of more MnO₂.

9. The process of treating oxidized zinc ores containing iron and manganese and other metals in conjunction with MnO₂ ores containing iron and zinc which consists, in mixing the oxidized zinc ore with carbon in proper proportion to secure selective chloridizing of the zinc, manganese and other metals and not of the iron, heating said mixture, treating the heated mixture with chlorine to selectively chloridize the zinc, manganese and other metals and not the iron, distilling off the ZnCl₂ thus formed leaving a distillation residue containing manganese chloride and condensing the ZnCl₂ to recover liquid ZnCl₂, filtering any contained solid impurities out of said liquid ZnCl₂ and returning said impurities for treatment with more zinc ore, leaching the zinc ore distillation residue with the filtrate mentioned below to recover the MnCl₂ therefrom; leaching MnO₂ ore with HCl to recover the Mn as MnCl₂ in solution and generate chlorine, recycling said chlorine to said selective chloridizing step and precipitating any iron present in the MnCl₂ solution with ZnCO₃ ore and separating the ore residue and precipitated iron from the MnCl₂ solution, washing said ore and precipitate with water and using the wash solution in leaching more MnO₂ ore, precipitating any other metals present in the MnCl₂ solution with metallic zinc and separating the precipitated metals from said solution, heating, evaporating and concentrating the MnCl₂ solution and recovering MnCl₂ from the concentrated residual solution as crystals of MnCl₂.2H₂O, recycling part of said residual solution for the leaching of more MnO₂ ore, diluting the remainder of said residual solution with wash solutions from subsequent filtering operations, precipitating the zinc and magnanese threfrom with lime, filtering and washing the precipitate thus formed and adding the precipitate to more of the zinc ore being chloridized, using the resultant filtrate for the leaching of more of the zinc ore distillation residue and more MnO₂ ore, drying said crystals and treating the dried MnCl₂ product with steam and air to decompose the MnCl₂ and recover a manganese oxide product and HCl, and using said HCl for the treatment of more MnO₂.

10. In a combined process of treating oxidized zinc ores containing iron and manganese and MnO₂ ores, the steps which consist in leaching the MnO₂ ore with HCl to generate chlorine and form MnCl₂ in solution, utilizing said chlorine, in combination with sufficient carbon, to selectively chloridize the zinc and manganese and not the iron in the zinc ore, distilling off the ZnCl₂ from the treated zinc ore and obtaining thereby a distillation residue containing manganese chloride, leaching said residue to recover the MnCl₂ therefrom, treating the MnCl₂ recovered from both ores with steam and air to make HCl and manganese oxide, and using said HCl in leaching more MnO₂.

11. In a combined process of treating oxidized zinc ores containing iron and manganese and MnO₂ ores containing zinc, the steps which consist in leaching the MnO₂ ore with HCl to generate chlorine and recover the manganese and zinc in solution as chlorides, using said chlorine, in combination with sufficient carbon, to selectively chloridize the zinc and manganese in the zinc ore, distilling off the ZnCl₂ from the zinc ore and obtaining thereby a distillation residue containing manganese chloride, leaching said residue to recover the MnCl₂ therefrom, evaporating the solution containing the MnCl₂ from both ores to recover the greater part of the MnCl₂ therefrom as MnCl₂—2H₂O, separating the MnCl₂—2H₂O from the residual solution, precipitating the residual manganese and zinc from last solution with lime, and adding said precipitates to more zinc ore to be chloridized.

12. In a process according to claim 11, the additional steps which consist in treating the recovered MnCl₂ with steam and air to form a manganese oxide product and HCl, and using said HCl to leach more MnO₂.

NIELS C. CHRISTENSEN.

REFERENCES CITED

The following references are of record in the file of this patent:

UNITED STATES PATENTS

| Number | Name | Date |
|---|---|---|
| 1,748,748 | Ashcroft | Feb. 25, 1930 |
| 1,743,740 | Von Girsewald | Jan. 14, 1930 |
| 2,262,185 | Jacobs | Nov. 11, 1941 |